United States Patent
Pickering et al.

(10) Patent No.: US 8,144,580 B2
(45) Date of Patent: Mar. 27, 2012

(54) METHOD AND APPARATUS FOR COMMUNICATING DATA OVER A DATA NETWORK AND CONTROLLING AN AMOUNT OF BANDWIDTH A USER CAN TRANSMIT OR RECEIVE OVER A DSL CONNECTION

(75) Inventors: Ashley Pickering, Ipswich (GB); Philip Everett, Ipswich (GB); Norwin Simms, Belfast (GB); Gary Dalby, Barking Tye (GB); Trevor Linney, Stowmarket (GB)

(73) Assignee: British Telecommunications Public Limited Company, London (GB)

( * ) Notice: Subject to any disclaimer, the term of this patent is extended or adjusted under 35 U.S.C. 154(b) by 402 days.

(21) Appl. No.: 11/989,136

(22) PCT Filed: Jul. 28, 2006

(86) PCT No.: PCT/GB2006/002826
§ 371 (c)(1),
(2), (4) Date: Jan. 22, 2008

(87) PCT Pub. No.: WO2007/012869
PCT Pub. Date: Feb. 1, 2007

(65) Prior Publication Data
US 2009/0103559 A1    Apr. 23, 2009

(30) Foreign Application Priority Data

Jul. 29, 2005 (EP) ..................................... 05254769
Mar. 22, 2006 (EP) ..................................... 06251521

(51) Int. Cl.
*H04L 12/26* (2006.01)
(52) U.S. Cl. ..... 370/230; 370/236; 370/463; 379/92.01; 379/112.04; 379/112.05

(58) Field of Classification Search .................. 370/431, 370/463, 229, 230; 379/111, 112, 112.01, 379/112.06, 112.08
See application file for complete search history.

(56) References Cited

U.S. PATENT DOCUMENTS
2005/0021716 A1    1/2005 Adamczyk et al.
(Continued)

FOREIGN PATENT DOCUMENTS
WO    03/009541        1/2003
WO    03/009541 A1    1/2003

OTHER PUBLICATIONS

Anschutz, "DSL Evolution—Architecture Requirements for the Support of QoS-Enabled IP Service," Technical Report DSL Forum TR-059, Sep. 1, 2003, pp. 1-48, XP002364004.*

(Continued)

*Primary Examiner* — Hassan Kizou
*Assistant Examiner* — Siming Liu
(74) *Attorney, Agent, or Firm* — Patterson Thuente Christensen Pedersen, P.A.

(57) ABSTRACT

A management device for automatically provisioning a Broadband Remote Access Server (BRAS) for use in connecting Customer Premises Equipment (CPE) to an Internet Protocol (IP) network via a Digital Subscriber Line (DSL) a Digital Subscriber Line Access Multiplexor (DSLAM) and the BRAS, the management device comprising: a first interface for receiving from time to time data readings from the DSLAM indicative of the current or recent line rate of the DSL; a processor unit for calculating from the received data readings a consistent rate indicative of a consistent line rate of the DSL based on a plurality of data readings for the DSL from the DSLAM; and a second interface for transmitting provisioning messages to the BRAS for provisioning the BRAS to restrict data flowing to the DSL to a maximum rate selected by the management device in accordance with the calculated consistent rate.

20 Claims, 3 Drawing Sheets

U.S. PATENT DOCUMENTS

| | | |
|---|---|---|
| 2005/0021739 A1 | 1/2005 | Carter et al. |
| 2005/0123028 A1* | 6/2005 | Cioffi et al. .................. 375/222 |
| 2005/0174938 A1* | 8/2005 | Richardson et al. ....... 370/230.1 |
| 2010/0195666 A1* | 8/2010 | Adamczyk et al. ........... 370/465 |

OTHER PUBLICATIONS

International Search Report mailed Sep. 9, 2006 in PCT/GB2006/002826.

European Search Report dated Jan. 23, 2006 in EP 05 25 4769.

Anschutz, T., et al. (editor), "DSL Evolution—Architecture Requirements for the Support of QoS-Enabled IP Services," Technical Report DSL Forum TR-059, Sep. 1, 2003, pp. 1-48, XP002364004.

International Search Report for PCT/GB2006/002826 mailed Sep. 26, 2006.

* cited by examiner

METHOD AND APPARATUS FOR COMMUNICATING DATA OVER A DATA NETWORK AND CONTROLLING AN AMOUNT OF BANDWIDTH A USER CAN TRANSMIT OR RECEIVE OVER A DSL CONNECTION

This application is the U.S. national phase of International Application No. PCT/GB2006/002826 filed 28 Jul. 2006 which designated the U.S. and claims priority to EP 05254769.2, filed 29 Jul. 2005, and EP 06251521.8, 22 Mar. 2006, the entire contents of each of which are hereby incorporated by reference.

FIELD OF THE INVENTION

The present invention relates to a method and apparatus for communicating data over a data network. In particular, it relates to controlling the amount of bandwidth which a user can transmit or receive over an Asynchronous Digital Subscriber Line (ADSL) connection and an access network to the user's Internet Service Provider (ISP).

BACKGROUND TO THE INVENTION

ITU recommendation G992.1 specifies how the maximum bandwidth which can be supported over a particular ADSL connection between a particular Remote ADSL Transceiver Unit (ATU-R) and a particular Central office or network operator ADSL Transceiver Unit (ATU-C) may be determined at the time of initiation of the ADSL connection (see G992.1 Chapter 10) and may even be periodically re-negotiated during a connection (see G992.1 Appendix II); the maximum bandwidth in fact depends upon various factors which will differ from line to line and from time to time depending on things such as the amount of electromagnetic noise present in the environment of the ATU-R, etc.

However, despite this, it is common in most practical implementations of ADSL for a network operator to offer an end user a fixed bandwidth (commonly offered values being 500 kb (kilo bits/second, 1 Mb (Mega bits/second) and 2 Mb). In such circumstances, the initiation process happens in the standard way to establish the maximum bandwidth available over the connection, but instead of then setting up the connection at that maximum setting, it is simply checked whether or not this maximum is at least equal to the contractually agreed bandwidth, and if so, then the connection is made at this agreed amount (rather than the maximum available) but otherwise the connection is just not made at all.

For IP connections passing through the Access Network via an ADSL connection to an Internet Service Provider (and thus via a Point Of Presence (POP) to the Internet), in a typical currently extant access network, there are two aggregation points. One occurs at the Digital Subscriber Line Access Multiplexer (DSLAM) (discussed above) and the other occurs at a device known as the Broadband Remote Access Server (BRAS—pronounced "Bee Raz"). The BRAS polices data flowing from ISPs through the BRAS and on through the access network towards the DSLAM and ensures that the rate at which each ISP sends data to any given end user complies with a profile which is stored in respect of each end user and includes the maximum rate at which the end user is able to receive data (which is determined by the contractually agreed connection rate, e.g. 1 Mb). Any data sent in excess of the maximum permitted rate is thrown away by the BRAS which causes the sending source to throttle back its rate of transmission (by the normal operation of the Transport Control Protocol (TCP)) until it approaches the maximum rate permitted by the BRAS.

In addition, each ISP has a maximum permitted aggregated rate at which it may send data to all of its customers at any one time, through any particular BRAS. Usually an ISP will purchase sufficient capacity to maintain a predetermined number of its end users at full capacity at any one time, which predetermined number will typically represent only a small fraction of the total number of customers to which it is connected via the respective BRAS, since only a small number of users is expected to be downloading data simultaneously via a single BRAS at any one time. If too many customers are on-line and downloading data at any one time, the BRAS will reduce the amount of data sent to each user proportionality in order to bring the total amount of data transported down to a rate which satisfies the agreement between the access network operator and the ISP.

It would be desirable to provide a system in which, instead of setting up an ADSL connection at a prearranged bandwidth or not at all, the connection is set up at the maximum bandwidth which the connection can establish. Naturally, in order to permit the full rate of data to be transmitted over the ADSL connection, it is necessary, that the respective BRAS also permits at least that rate of data for that connection to be passed through the BRAS onto the access network.

The present applicant is aware of two previously proposed approaches for achieving this in cases where the ADSL connection bandwidth is not constrained to take on only a single value. One approach, which it is believed is currently in operation in New Zealand, is to not limit the amount of data which can pass through the BRAS in respect of any one connection, but simply to enforce that data from a single ISP may not exceed a certain amount. The end user (and/or the end user's machine on behalf of the end user) may negotiate with his/her ISP after the ADSL connection has been set up such that the ISP may allow data to pass into the access network at a rate which matches that which the ADSL connection can support. Alternatively data is sent at a rate settled by the TCP protocol (i.e. if a source is sending data too quickly—for whatever reason—packets will be lost until a rate is arrived at which ceases to cause packet loss). This approach should work reasonably well on networks which are not heavily used, but in more congested networks it is very inefficient.

An alternative proposed approach is that hinted at in the DSL Forum's Technical Report No. TR-059. In this report it suggests that the "BRAS MUST be provisioned so that it does not allow traffic to flow faster than the DSL "sync" rate [which is the maximum rate which the ADSL connection can support as determined by the ATU's at the time of setting up the connection]. The BRAS MAY be provisioned with the actual DSL sync rate to accomplish this."—see section 4.2.5.4 of TR-059 (which is on Page 21 of Version 10 of TR-059). Naturally, since TR-059 is a list of requirements rather than a description of a working system, it does not specify how this could be achieved. However, it seems to teach in the direction of communicating with the BRAS about each ADSL connection, at least every time such a connection is set up. However this solution would place a very heavy signalling burden on the access network and on each BRAS, given the current infrastructure in a typical access network for communicating with BRAS's.

SUMMARY OF THE INVENTION

According to a first aspect of the present invention, there is provided a method of providing a broadband data connection to an end user via an end user Digital Subscriber Line, DSL, modem, a local loop, a Digital Subscriber Line Access Multiplexer, DSLAM, an access network, a Broadband Remote Access Server, BRAS, and an onward connection to a service provider which may have a Point Of Presence on the Internet Backbone, the method comprising the steps of initiating a Digital Subscriber Line, DSL, connection over the local loop between the end user DSL modem and the DSLAM, determining the maximum attainable rate at which data may be transmitted downstream to the end user DSL modem over the DSL connection as determined between the end user DSL modem and the DSLAM, comparing the determined maximum attainable rate with a stored consistent value and, if the maximum attainable rate is lower than the stored consistent value, reducing the stored consistent value to the maximum attainable rate or, if the maximum attainable rate is equal to or greater than the stored consistent value, processing the maximum attainable rates determined on a predetermined number of the most recent occasions when a DSL connection has been initiated over the local loop to ascertain if the maximum attainable rate has consistently been higher than the stored consistent value, and if so, increasing the stored consistent value to the lowest higher rate consistently achieved; the method further including sending a message to the BRAS to inform it to limit traffic destined for the end user to a rate which is less than or equal to the stored consistent value.

According to a second aspect of the present invention, there is provided a management device for assisting the making of broadband data connections to end users each via an end user DSL modem, a local loop, a Digital Subscriber Line Access Multiplexer, DSLAM, an access network, a Broadband Remote Access Server, BRAS, and an onward connection to a service provider which may have a Point Of Presence on the Internet Backbone, the device including a DSLAM interface for receiving messages from the or each DSLAM and a BRAS interface for transmitting messages to the or each BRAS, a data store for storing data in respect of each connection with which it is associated and a processor unit for processing messages received from the or each DSLAM in combination with data stored in the data store to generate control messages for sending to the or each BRAS.

Preferably, in operation, the management device receives from the or each DSLAM messages indicating the maximum attainable rate at which data may be transmitted downstream to the end user DSL modem over the DSL connection as determined between the end user DSL modem and the DSLAM in respect of each DSL connection with which the management device is associated, processes these messages to determine, in respect of each connection, a consistent data rate which the connection has consistently been able to achieve over a predetermined period of time or for a predetermined number of connection initiations and, whenever this consistent rate changes for a particular connection, generates a message to send to the corresponding BRAS informing it of the new consistent data rate for that connection.

Preferably the management device is further operable to reduce the consistent data rate immediately to the maximum attainable rate most recently received from the DSLAM if this is less than the currently stored consistent data rate and then to generate a message straight away to go to the respective BRAS to inform it of the new consistent data rate.

Note that in practice the DSLAM may report a gross maximum attainable rate which includes the bandwidth required for signalling purposes. However, reference to the maximum attainable rate in the present specification means the net maximum attainable rate at which user data may be transmitted (i.e. the gross maximum attainable rate minus that portion required for signalling). Calculation of the amount of bandwidth required for signalling may conveniently be performed by the management device or alternatively it may be performed by the BRAS.

By looking for a consistently achievable rate at which to set the BRAS, the number of messages that need to be sent to the BRAS can be dramatically reduced whilst still maintaining a good service to each end user. However, by ensuring that if the maximum attainable rate ever drops below that at which the BRAS is currently set, then a message is sent out immediately to lower the BRAS setting, the user will not experience dropped traffic even if an unusually low maximum attainable rate is negotiated for a particular connection initiation.

According to a third aspect of the present invention, there is provided a method of provisioning an interface device, the interface device interfacing between an access network and a back-bone network, the access network including a Digital Subscriber Line, DSL, connection to an end user terminal and a transceiver device including a DSL transceiver for modulating and demodulating signals sent to and from the end user terminal over the DSL connection, the method comprising:

providing a management device for managing the interface device;

receiving data readings from the transceiver device indicative of the current or recent line rate of the DSL connection;

calculating at the management device from the received data readings a consistent rate indicative of a consistently achievable line rate of the DSL connection based on a plurality of data readings for the DSL connection from the transceiver device; and provisioning the interface device to restrict data flowing to the DSL connection to a maximum rate selected by the management device in accordance with the calculated consistent rate.

Preferably the data readings are sent automatically to the management device by the transceiver device, or an intermediate transceiver device managing device, to the management device, either periodically, or in response to a sync/re-sync event on the DSL connection.

Preferably the interface device is re-configured shortly after detecting that the DSL connection line rate has dropped to a new profile, but is re-configured to a new higher profile only after a longer delay to ensure that the increase is sustained for a minimum period. Each profile of the interface device corresponds to a range of different corresponding line rates of the DSL connection.

Further aspects of the invention include processor implementable instructions for causing a processor controlled device to carry out the method of the first aspect of the present invention and carrier means carrying such processor implementable instructions.

BRIEF DESCRIPTION OF THE FIGURES

In order that the present invention may be better understood, embodiments thereof will now be described, by way of example only, with reference to the accompanying drawings in which.

DETAILED DESCRIPTION OF EMBODIMENTS

Main Embodiment

Figure 1:
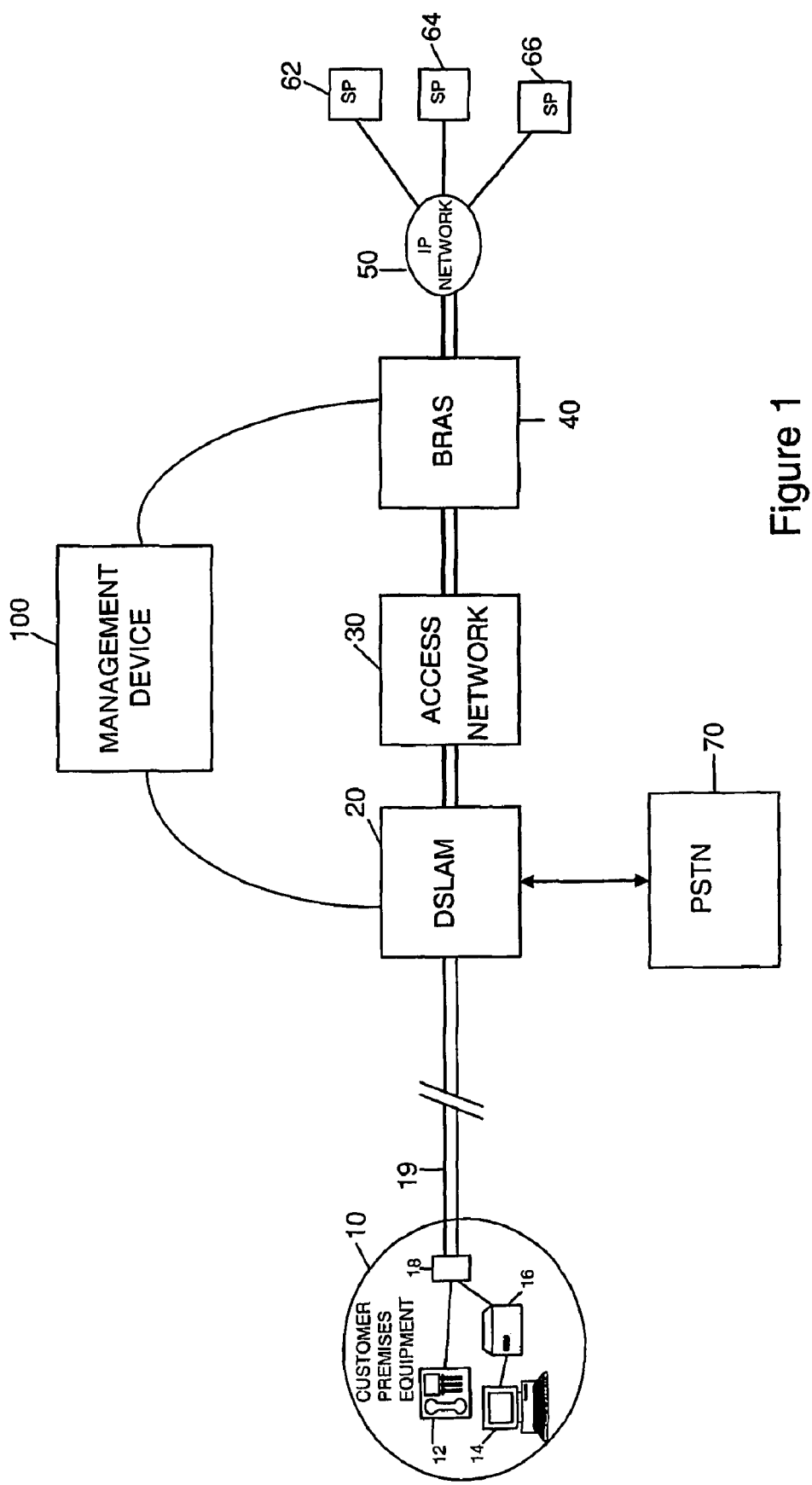
FIG. 1 is a schematic block diagram illustrating a telecommunications network incorporating a management device according to a first aspect of the present invention.

Referring to FIG. 1, a first embodiment of the present invention is illustrated in overview. A copper pair loop 19 connects customer premises equipment 10 to a DSLAM 20 located within a local exchange (also known as a central office in the US). The DSLAM separates normal voice traffic and data traffic and sends the voice traffic to the Public Switched Telephone Network (PSTN) 70. The data traffic is passed on through an Access Network 30 (which will typically be an ATM network as is assumed in this embodiment) to a Broadband Remote Access Server (BRAS) 40 at which several IP traffic flows from (and to) multiple Service Providers (SP's) 62, 64, 66 are aggregated (and disaggregated) via an IP network 50 (which may, of course, itself be provided on top of an ATM network). Within the customer premises equipment 10, there is an ADSL splitter filter 18 a telephone 12 and ADSL modem 16 and a computer 14.

The above mentioned arrangement of items 10, 19, 20, 30, 40, 50, 62, 64, 66 and 70 is conventional. However, in addition to this conventional arrangement, in the present embodiment there is a management device 100 which communicates between the DSLAM 20 and the BRAS 40. The detailed operation of this device is explained in greater detail below with reference to FIGS. 2 and 3. However, in overview it obtains information from the DSLAM 20 about the rate at which each Digital Subscriber Line (DSL) connects to the DSLAM (in the present embodiment this is done by periodically polling the DSLAM—four times per day—and asking it for two related items of data in respect of the DSL: the Actual Line Rate and the Maximum Achievable Line Rate—these are discussed in greater detail below). The management device then processes this information to assess a consistent connection speed achieved by each such DSL. If it determines that this consistent rate has increased as a result of recent higher rate connections, it instructs the BRAS to allow higher through flows of traffic for that DSL. On the other hand, if it detects that a particular connection speed is below the stored consistent value, it reduces the consistent value to the current connection rate and immediately informs the BRAS of the new consistent value rate so that the BRAS does not allow more traffic to flow to the DSL than the DSL is currently able to cope with. The exact algorithm used by the management device to calculate the consistent rate in the present embodiment is described below. However, it should be noted that the intention of the algorithm is to arrange that the user will receive data at the highest rate which his/her DSL is consistently able to obtain without requiring the BRAS to be reconfigured every time the DSL is connected. At the same time the algorithm seeks to ensure that if the DSL connects at a rate which is below that at which the BRAS is currently configured to allow data through, then the BRAS is quickly reconfigured to avoid overloading the DSLAM. The reason for wanting to avoid having to contact the BRAS each time a DSL connects to the DSLAM is because with current systems it is not generally possible to reconfigure the BRAS without a significant delay (e.g. of a few minutes). Furthermore, there is a limit to the rate at which a BRAS can process reconfiguration requests. These restrictions are sometimes referred to by saying that the BRAS needs to be provisioned, and drawing a distinction between systems which are switched (e.g. ATM Switched Virtual Circuits) and systems which are provisioned. Current systems allow for quite quick provisioning (often a matter of minutes rather than days or weeks) but there is still a significant difference between such quick provisioning and realtime switching.

Figure 2:
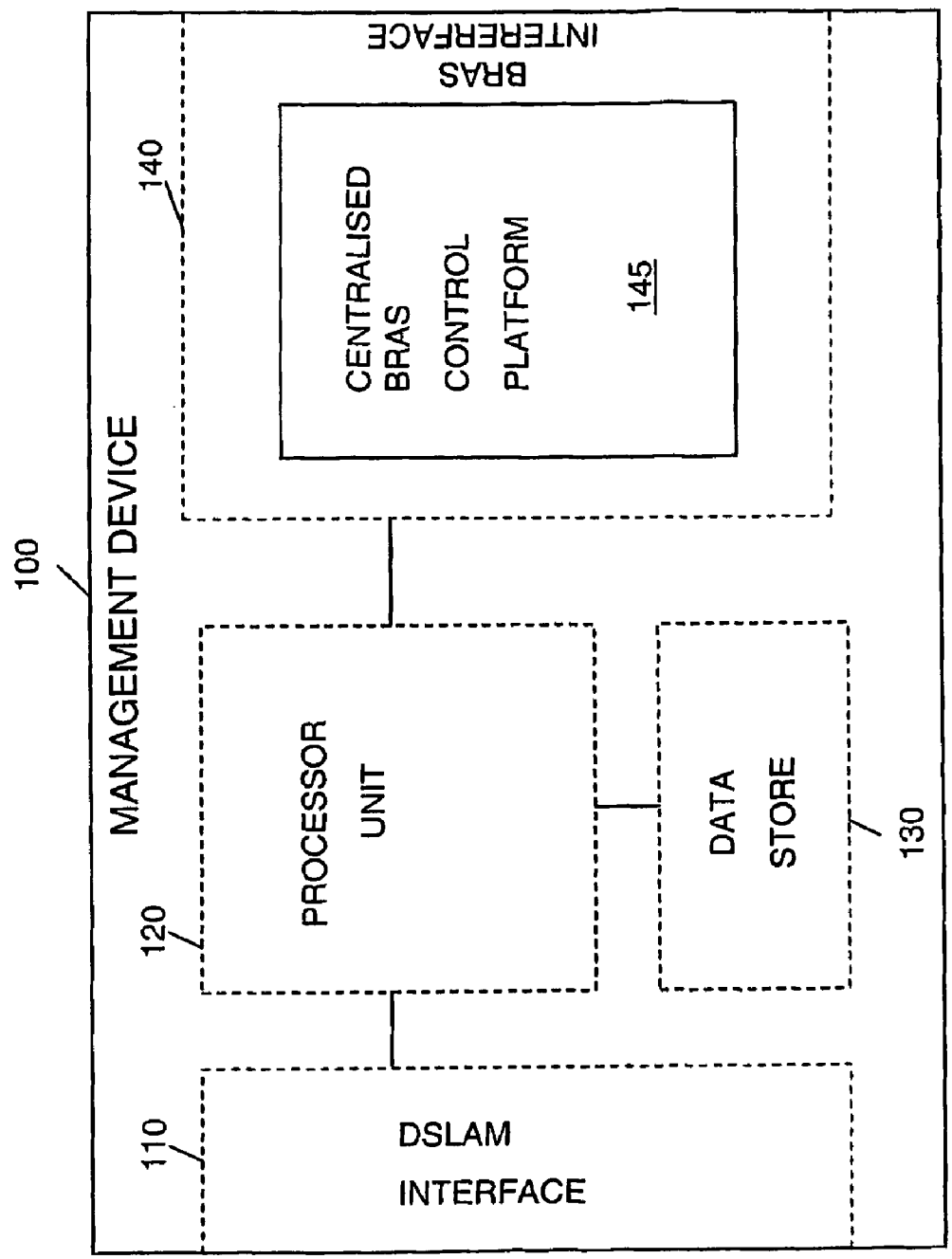
FIG. 2 is a schematic block diagram illustrating the management device of FIG. 1 in more detail.

Referring now to FIG. 2, the management device 100 of the present embodiment comprises a DSLAM interface 110, a processor unit 120 a data store 130 and a BRAS interface 140. In the present embodiment, the BRAS interface 140 includes a centralised BRAS control platform 145 such as that currently found in many broadband access networks and conventionally used to provision the BRAS in accordance with a particular profile as agreed between a Service Provider and its customer (to whom the ADSL service is being provided). As mentioned above, this is conventionally done on a very static basis (e.g. a customer purchases a 1 Mbps ADSL service and the BRAS is configured to allow a corresponding rate of data through to the DSL in question). In the present embodiment the pre-existing centralised BRAS control platform is used as the BRAS control platform 145 forming part of the BRAS interface 140 and it is therefore physically separate from the rest of the management device 100 however this need not be the case in other embodiments.

The data store 130 maintains in respect of each DSL which it is managing (note that it is anticipated that a single management device 100 will cover an entire country- or region-wide broadband access network and may therefore be managing up to several million such lines) an indication of the current consistent rate for that line, historical information about the data retrieved from the DSLAM during preceding polls (explained in greater detail below) and physical data about the DSL such as the DSLAM to which it is connected (and the port on the DSLAM to which it is connected) and the BRAS 40 through which it is connected to the IP Network 50.

In the present embodiment the Management device (apart from the BRAS control platform 145) is implemented on a single server computer. However in alternative embodiments in which many millions of lines may need to be managed the management device 100 may be implemented on plural distributed server computers and the data store 130 may be provided by a separate data warehousing function, etc.

Figure 3:
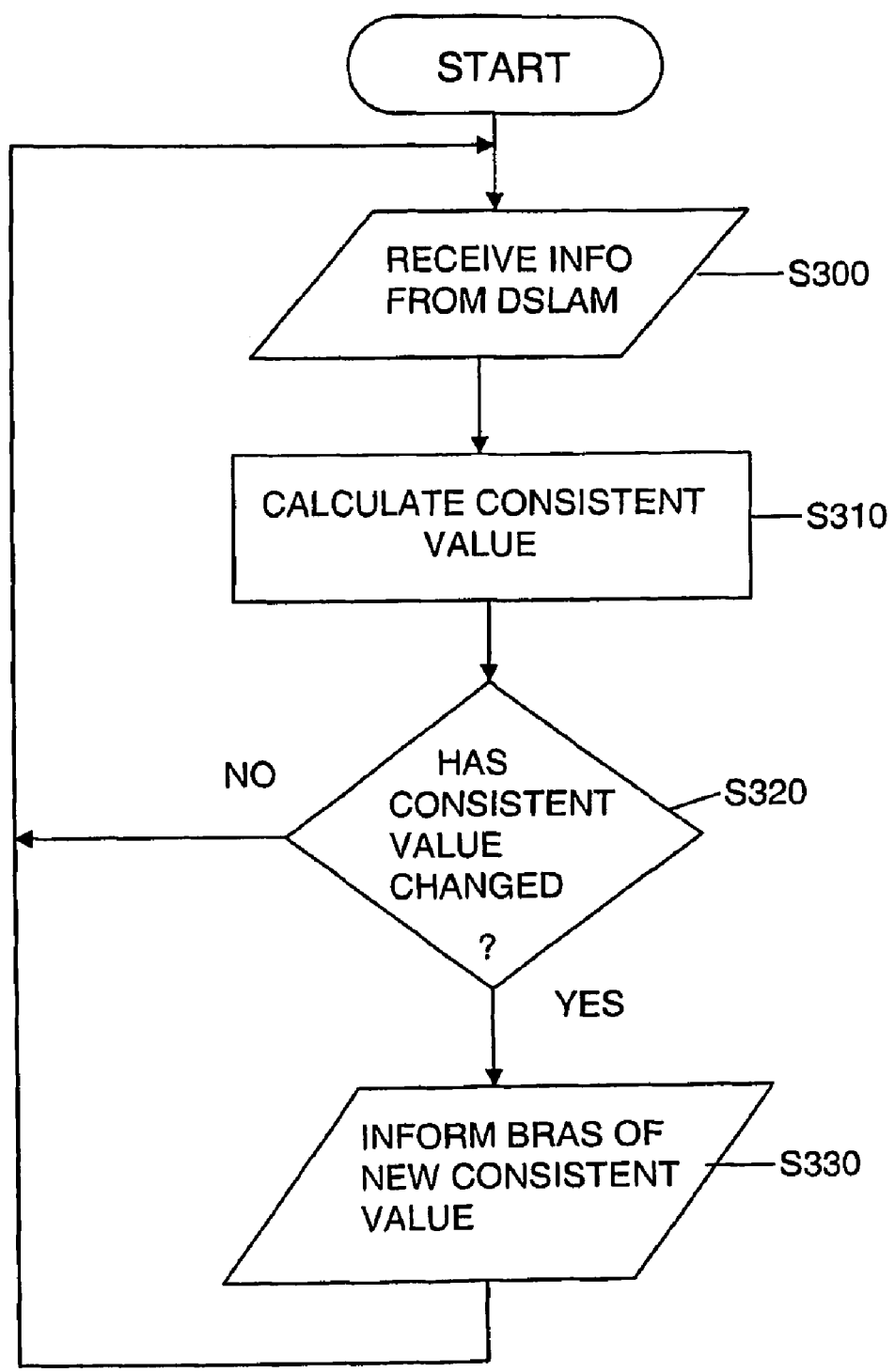
FIG. 3 is a Flow diagram illustrating the steps carried out by the system of FIG. 1 to maintain the BRAS settings at appropriate values.

Referring now to FIG. 3, in overview, the method employed by the management device comprises an input step of receiving information from the DSLAM S300. As mentioned above, in the present embodiment this information is obtained by having the management device poll each DSLAM, in respect of each DSL which the management device is managing, four times a day. As mentioned above, the information requested on each poll is the so called Actual Line Rate (ALR) and the Maximum Achievable Line Rate (MALR).

The ALR value provides a reading of the actual line rate that the system has synchronised at. If the system has been configured to deliver a fixed bit rate connection to the end user then the ALR value should be equal to this configured rate. Note that the ALR is only available if there happens to be an active connection in process between the respective CPE 10 and the corresponding DSLAM 20.

The MALR figure represents an estimate provided by the DSL system of the maximum possible line rate that is achievable under the current noise conditions. MALR is typically only calculated once during the start-up sequence of the DSL modems and then remains fixed throughout that session. The MALR is used as an indication of line rate because it is generally available even when there is no DSL connection active (in which case the ALR value is given as NULL).

As mentioned above, if the system has been configured to deliver a fixed bit rate connection to the end user then the ALR value is equal to this configured rate, whereas the MALR expresses the maximum rate which the line should be able to support. When the system is configured to run at the maximum possible rate (i.e. not constrained to any fixed rate) then the ALR value and MALR should in theory be the same. However, in practice there is often a small difference between the values since they are calculated slightly differently.

Upon completion of step S300 the method proceeds to step S310 where the data is used to calculate a consistent value. In the present embodiment this is achieved according to the algorithm described below under the heading "The Algorithm". In summary however, the Algorithm operates by averaging the results of the polls taken during each day to maintain a daily average, and averaging the daily averages at the end of each week to generate a weekly average, and averaging the preceding n daily averages to maintain two rolling averages, one with n=2 and one with n=7; in the present embodiment the lowest of the most recently polled Line Rate reading (ALR or MALR) and the two rolling averages is used as the consistent rate. The thus found lowest value is then compared with the Min and Max Line Rates of the various BRAS profiles (to find the Profile for which the lowest value falls between the Profiles Min and Max Line Rates) and in step S320 it is determined whether or not this Profile is different to that currently applied to the respective DSL and if so it is determined that the consistent value has changed and the profile corresponding to this new rate is selected as the new current consistent rate and it is sent to the BRAS in step S330 which is instructed to reconfigure itself according to the new supplied profile.

The profile includes a number of items of information needed by the BRAS, but the most important for the purposes of the present invention is the rate at which the BRAS will permit data to flow to the DSL which is specified in the profile as the ATM payload (and which is approximately equal to the headline rate which is the advertised rate, the headline rate always being a round number); there are a finite number of these different profiles with different headline rates, increasing from 1 Mbs to 8 Mbs in steps of 0.5 Mbs.

An advantage of this embodiment is that if the user experiences an anomalously low Line Rate as a one off during a single connection, the BRAS will be quickly reconfigured for that connection and then reconfigured back to the higher rate as soon as a more normal connection is made. A disadvantage however is that it is possible for a situation to arise where the Line rate oscillates such that the profile regularly changes and the BRAS needs to be frequently re-provisioned. To overcome this problem, in the present embodiment it is possible to over-ride the selection algorithm manually and insert a default profile—the default profile is then selected as the highest possible profile for the respective DSL (although lower profiles can still be selected automatically according to the algorithm, where the algorithm deems this appropriate).

Alternative Embodiment

In an alternative embodiment, at step S320 the most recently polled Line Rating is used to check for a reduced consistent rate whilst the weekly average is used to check for an increased consistent rate (such that the consistent rate may only be increased on a once a week basis when the weekly average rate is calculated, although it may be decreased whenever a lower Line Rating is polled). The consistent rate determined in this way is then used for selecting a profile for applying to the BRAS.

Thus if at the end of a given week the weekly average is found to fall within a new higher headline rate profile, then at step S320 the method proceeds to step S330 and the BRAS is informed (via the centralised BRAS control platform 145) that it should reconfigure itself in respect of the respective DSL according to the supplied (higher rate) profile.

On the other hand, if any single ALR (or MALR if the ALR for a given reading is NULL, indicating that there is no current connection) is detected as being below the Min Line Rate for the current profile (which is in fact somewhat higher than the headline rate because the Line Rate includes a large amount of overhead which does not count as data) then at step S320 it is straightaway determined that the consistent value has changed and the profile corresponding to this new reduced rate is immediately selected as the new current consistent rate and it is immediately sent to the BRAS in step S330 which is instructed to reconfigure itself according to the new (lower) supplied profile. If subsequent polls of the DSLAM reveal that this low rate measurement was an anomaly (for whatever reason), then at the end of the week it is likely that the weekly average will be back in the higher profile and the BRAS will then be re-provisioned at the higher rate. However, since the decision to increase the consistent rate is only taken on, at most, a weekly basis, according to this alternative embodiment, there should not be excessive re-provisioning of the BRAS unless the ALR (or MALR) consistently drops.

The Algorithm for the Main Embodiment

The day is split into 4 time slots used for polling the DSLAM as follows:

| Slot | Start time hh:mm:ss | End time hh:mm:ss |
| --- | --- | --- |
| 1 | 04:00:00 | 09:59:59 |
| 2 | 10:00:00 | 15:59:59 |
| 3 | 16:00:00 | 21:59:59 |
| 4 | 22:00:00 | 03:59:59 |

For each end user the DSLAM is polled twice to return up to two values, the Actual Line Rate and the Maximum Achievable Line Rate. If the end user is not currently logged on at the time the DSLAM is polled the Actual Line Rate is not returned. For certain DSLAM's based on the manufacturer and Build Level the Maximum Achievable Line Rate may not be returned either.

For any given set of two polls to a DSLAM, the management device may receive one, both or neither of the Line Rate values and the management device stores the returned data for each timeslot to use in various calculations and also stores this data historically for the last 30 days.

(Important Note: for all calculations if the Actual Line Rate exists for a time slot this will be used in preference over the Maximum Achievable Line Rate.)

Daily Average Line Rate Calculation

Each time the DSLAM is polled, the Daily Average is calculated unless both the Actual and Maximum Achievable Line Rates are NULL in which case the previous calculation is kept. After each poll, the Line Rates for each time slot, for that day only, are added together (note only one Line Rate per time slot) and then this total is divided by the number of time slots for that day (which had at least one Line Rate value).

Example 1A

After 1 Poll of the DSLAM

| Slot | Actual Line Rate | Maximum Achievable Line Rate |
|---|---|---|
| 1 | 4064 | 4192 |

Daily Average = Slot 1 Actual +/1 time slot = 4064/1 = 4064

Example 1B

After 2 Polls of the DSLAM

| Slot | Actual Line Rate | Maximum Achievable Line Rate |
|---|---|---|
| 1 | 4064 | 4192 |
| 2 | NULL | 4192 |

Daily Average = Slot 1 Actual + Slot 2 Maximum/2 time slots = 4064 + 4192/2 = 4128

Example 1C

After 3 Polls of the DSLAM

| Slot | Actual Line Rate | Maximum Achievable Line Rate |
|---|---|---|
| 1 | 4064 | 4192 |
| 2 | NULL | 4192 |
| 3 | 4096 | 4192 |

Daily Average = Slot 1 Actual + Slot 2 Maximum + Slot 3 Actual/3 time slots = 4064 + 4192 + 4096/3 = 4118 (rounded up to nearest 1 kb)

Example 1D

After all 4 Polls to the DSLAM

| Slot | Actual Line Rate | Maximum Achievable Line Rate |
|---|---|---|
| 1 | 4064 | 4192 |
| 2 | NULL | 4192 |
| 3 | 4096 | 4192 |
| 4 | 4096 | 4192 |

Daily Average = Slot 1 Actual + Slot 2 Maximum + Slot 3 Actual + Slot 4 Actual/4 time slots = 4064 + 4192 + 4096 + 4096/4 = 4112

Example 2A

After 1 Poll of the DSLAM

| Slot | Actual Line Rate | Maximum Achievable Line Rate |
|---|---|---|
| 1 | NULL | NULL |

Daily Average = NULL

| Slot | Actual Line Rate | Maximum Achievable Line Rate |
|---|---|---|
| 1 | NULL | NULL |
| 2 | NULL | NULL |

Daily Average = NULL

Example 2C

After 3 Polls of the DSLAM

| Slot | Actual Line Rate | Maximum Achievable Line Rate |
|---|---|---|
| 1 | NULL | NULL |
| 2 | NULL | NULL |
| 3 | NULL | 2464 |

Daily Average = Slot 3 Maximum/1 time slot = 2462/1 = 2462

Example 2D

After all 4 Polls of the DSLAM

| Slot | Actual Line Rate | Maximum Achievable Line Rate |
|---|---|---|
| 1 | NULL | NULL |
| 2 | NULL | NULL |
| 3 | NULL | 2464 |
| 4 | 2400 | 2464 |

Daily Average = Slot 4 Maximum + Slot 4 Actual/2 time slots = 2462 + 2400/2 = 2432

If all Actual and Maximum values are NULL for the day, then the daily average will be NULL.

Weekly Actual and Maximum Achievable Line Rate Calculations

After 7 days from the date of commencement of management of a particular DSL by the management device and then every 7 days after this a Weekly Average Line rate is calculated.

This weekly value is stored historically for a year, 52 occurrences.

On the day specified the Daily Average Line Rates for each day over the previous 7 days are added and then divided by 7 (minus the number of Daily Averages which were NULL).

Example 3

Daily Average for all 7 Days in the Week

| Day | Daily Average |
| --- | --- |
| 1 | 6127 |
| 2 | 6135 |
| 3 | 6145 |
| 4 | 6178 |
| 5 | 6156 |
| 6 | 6148 |
| 7 | 6122 |

The divisor is 7 minus the number of Daily Averages which are NULL. In this case there are no days which are NULL so 7−0=7

$$\text{Weekly } LR = D1 + D2 + D3 + D4 + D5 + D6 + D7/7$$

$$= 6127 + 6135 + 6145 + 6178 + 6156 + 6148 + 6122/7$$

$$= 6145 \text{ (rounded up to nearest 1 kb)}$$

Example 4

No Daily Average for 2 Days in the Week

| Day | Daily Average |
| --- | --- |
| 1 | 3392 |
| 2 | NULL |
| 3 | 3392 |
| 4 | NULL |
| 5 | 3584 |
| 6 | 3520 |
| 7 | 3328 |

As days 2 and 4 are both NULL, if the summation were calculated and divided by 7 this would give an incorrect average value. Therefore the divisor is 7 minus the number of Daily Averages which are NULL. In this case 7−2=5

$$\text{Weekly } LR = D1 + D3 + D5 + D6 + D7/5$$

$$= 3392 + 3392 + 3584 + 3520 + 3328/5$$

$$3444 \text{ (rounded up to nearest 1 kb)}$$

If all daily averages are NULL for the all 7 days, then the weekly average is NULL. If a NULL value occurs for the weekly average after the first 7 days of service then an exception notification is raised by the management device as a 'warning'.

Rolling Average Calculations

There are two rolling averages used which are both configurable to provide a Line Rate average over n time slots.

The rolling averages are not stored historically and every time the daily average is recalculated the rolling averages are recalculated. Therefore the rolling averages could be recalculated up to 4 times a day.

The rolling average is the summation of the last n days daily averages divided by n (minus the number of daily averages which are NULL).

Example 5

If n=2 (Average Over the Last Two Days)

| Day | Daily Average |
| --- | --- |
| 1 | 7712 |
| 2 | 7776 |

Rolling Average over n days (n=2)=
(D1+D2)/2
=(7712+7776)/2
=15488/2
=7744

Example 5

If n=4 (Average Over the Last Four Days) but for 2 Days We Received No Data

| Day | Daily Average |
| --- | --- |
| 1 | 6272 |
| 2 | NULL |
| 3 | NULL |
| 4 | 6368 |

As days 2 and 3 are both NULL, if the summation were calculated and divided by n (4) this would give an incorrect value. Therefore the divisor is n minus the number of daily averages which are NULL. In this case 4−2=2

Rolling Average over n time slots (n=4)
=(D1+D4)/2
=(6272+6368)/2
=12640/2
=6320

If all n values for the Daily Averages are NULL for the Rolling Average then the Rolling Average is left at the previous value.

Updating BRAS Profiles

The BRAS Profiles are updated based on the following Logic.

Each time the Rolling Averages have been recalculated they are compared, with the Latest Line Rate Recorded (ALBR) and the lowest of these three is used to determine the best rate at which to set the BRAS.

The lowest value is compared with the Min Line Rate and Max Line Rate on the DSLAM—RAS Profile Mapping table to identify the suitable BRAS Profile (the profile for which the lowest value falls between the Min and Max Line Rates given in the profile).

If this profile differs from the current BRAS Profile then the current BRAS profile is updated and relevant values are sent to RAP to configure the BRAS.

If the two profiles do not differ, no updates occur.

Example 6

Rolling Average 1 (where n=2)=4736
Rolling Average 2 (where n=7)=4210
Latest Line Rate (ALBR)=4576
Rolling Average 2 will be compared with the DSLAM—RAS Profile Mapping table as the lowest of the three values.

For an IPstream Home customer the row which Rolling Average 2 falls within is:

| Min Line Rate | Max Line Rate | ATM Payload | Ras Profile | Headline Rate | Home or Office | DS_PCR | DS_SCR | DS_MBS | SVCTYP |
| --- | --- | --- | --- | --- | --- | --- | --- | --- | --- |
| 3968 | 4512 | 3584 | adsl3500 | 3500 | H | 3957 | 3957 | 190 | IPH |

Therefore the suitable BRAS Profile is adsl3500 and if this differs from the current BRAS profile it is updated and the DS_PCR, DS_SCR, DS_MBS and SVCTYP are sent to the centralised BRAS control platform 145.

Override value: An override value is available within the management device (mentioned above as a default value) and can be entered via an override GUI. This is done, for example, where a line is flapping and it is preferable to set it to a lower speed. Where an override has been set it is used, however it should also be noted that the BRAS may be set to a lower speed than the override, but may never be set to anything higher than the override value.

Variations

An alternative algorithm and method for calculating a consistent BRAS profile for use with the management device of the present invention will now be described.

In this embodiment, the management device performs an additional function of managing the line profile of each DSL (e.g. to change the DSL from operating in a "Fast" mode to operating in an "interleaved" mode) as well as the function of controlling each corresponding BRAS for each DSL to be correctly provisioned according to a consistently achievable sync rate achieved by each DSL.

Furthermore, in this embodiment, each DSLAM (or element manager managing one or more DSLAMS) sends data in an unsolicited manner to the management device. Two types of data are sent: a daily report of the synced line rates of its corresponding DSL's which may contain up to 96 (15 minute interval) slots for each DSL; and data about individual DSL's whenever they sync (this ideally takes the form of a small message (e.g. a Simple Network Message Protocol (SNMP) message) sent every time a DSL sync or re-sync takes place; however, it may—less ideally—take the form of a single larger message sent about every 15 minutes aggregating all such sync/re-sync events taking place within that period). The daily report information is generally used by the line profile management function to observe any DSL's which are regularly losing connection and automatically re-syncing etc. but may also be used by the BRAS profile management function for stable DSL's (especially ones connected via a router which is left permanently switched on and connected to the Internet) to provide a new daily measurement of the "new line rate" variable discussed below. The messages indicating that a sync/re-sync event has recently taken place on a particular DSL is, however, used as the main source for setting the "new line rate" variable discussed below.

In overview, the algorithm for managing BRAS profiles in this embodiment checks each time it receives an indication of a new sync/re-sync event whether the "new line rate" is such that the BRAS profile should be updated. If the "new line rate" is such that the BRAS profile should be reduced to a lower setting, then it is immediately reduced to the new lower setting, if the "new line rate" is such that it exactly matches the current BRAS profile then it is left unchanged, if the new line rate is such that the BRAS profile should be increased to a higher setting, then the algorithm will do so, but only after a sufficient number of such "new line rates" have been received over a few days to indicate that the increase would be sustainable.

In order to implement this functionality, a number of variables are stored in a database in respect of each DSL. These are:

1. New Line Rate—the line rate stored due to latest sync/resync event

2. New BRAS Profile—the BRAS profile associated with New Line Rate

3. Proposed Line Rate—the lowest line rate higher than the Potential Line rate, received in a previous sync 4. Proposed Calculated BRAS Profile—BRAS Profile associated with Proposed Line Rate (this is also sometimes referred to as the "Proposed BRAS Profile" by way of abbreviation 5. Potential BRAS Profile—the Potential BRAS Profile MAX holds for the end user (defaults initially to 2 MB profile). Unless the line is over-ridden, this is the line rate currently set at the BRAS, which the end user is actually receiving.

6. Upgrade Counter—Incremental counter

7: Upgrade Counter Incremented Date—Date on which the counter was last incremented (the reason for this variable is explained below)

8. Upgrade Threshold—An operator settable threshold value for the Upgrade Counter at which an upgrade of BRAS Profile will occur (Note this is essentially a constant and it is not therefore generally altered as a result of a sync/re-sync event being processed).

9. Status—The status of the sync event (this is used to let a separate process (referred to as the interface manager in the present embodiment) for updating the BRAS's know when a new profile should be set at a BRAS—this is discussed in greater detail below).

When an End User (EU) line rate is received this triggers an application running in the management device (which application is hereinafter referred to as the MAX Analyser) to access the corresponding record within the database and perform the following: The new line rate is compared with the values in a DSLAM_BRAS Profile Mapping table to identify the BRAS profile associated with that line rate.

Example 1

New Line Rate=4448
The row within which the line rate will fall is:

| Min Line Rate | Max Line Rate | ATM Payload | BRAS Profile | Headline Rate | Home or Office | DS_PCR | DS_SCR | DS_MBS | SVCTYP |
|---|---|---|---|---|---|---|---|---|---|
| 3968 | 4512 | 3584 | adsl3500 | 3500 | H | 3957 | 3957 | 190 | IPH |

The BRAS Profile associated with a line rate of 4448 is therefore adsl3500.)

If the line rate received falls outside of any of the min/max ranges for the BRAS profiles available then an error is raised.

This "New BRAS profile" is stored in the appropriate field in the database and then compared with the "Potential BRAS Profile" for that EU: Depending on the result of the comparison, the algorithm follows one of 3 options:

Option 1

This option is followed if the New BRAS Profile<Potential BRAS Profile (recall that generally the Potential BRAS Profile is the profile at which the BRAS is currently actually configured). i.e. if the new line rate is lower than that for which the current BRAS profile caters. In this case the BRAS Profile should be modified straight away and therefore:

Set Potential BRAS Profile to the value of the New BRAS Profile.
    Nullify Proposed Line Rate
    Nullify Proposed Calculated BRAS Profile
    Set Upgrade Counter to Zero
    Nullify Upgrade Counter Incremented Date
    Set Status to 'P' for Processed (Setting the status to "P" for Processed lets the interface manager know that the BRAS needs to be reconfigured for the respective DSL according to the current value of the Potential BRAS Profile—in the present embodiment, this is implemented by having the interface manager periodically (e.g. once every few minutes) trawl through all of the records held on the database and extract all entries for which the status is set to "P"—it then changes the status for these selected records to "I" (which stands for Intermediate) (so that they are not picked up again on the next trawl—unless a new sync/resync event has caused the Potential BRAS Profile to be changed by the MAX Analyser again!). Once the interface manager has determined that the BRAS has been updated to the new profile, it sets the status for that record back to a status of "N" which stands for "No Change".)

Example 2

Of a Case where Option 1 is Followed

Event: New Line Rate=2304
New BRAS Profile=adsl2000
State: Potential BRAS Profile=adsl3500
Result: Maintain Potential BRAS Profile=adsl2000
Nullify Proposed Line Rate
Nullify Proposed BRAS Profile
Set Upgrade Counter=0
Nullify Upgrade Counter Incremented Date
Set Status=P Option 2

This option is followed if the New BRAS Profile is the same as the current Potential BRAS Profile. In this case no change is required to the BRAS profile. However, the effects of any previous sync/re-sync events with higher new BRAS profiles are nullified. Therefore, the following results occur:
    No change to Potential BRAS Profile
    Nullify Proposed Line Rate
    Nullify Proposed Calculated BRAS Profile
    Set Upgrade Counter=0
    Nullify Upgrade Counter Incremented Date
    No change to Status

Example 3

Of Case where Option 2 is Followed

Event: New Line Rate=5312
New BRAS Profile=adsl4500
State: Potential BRAS Profile=adsl4500
Status=N
Result: Maintain Potential BRAS Profile=adsl4500
Nullify Proposed Line Rate
Nullify Proposed BRAS Profile
Set Upgrade Counter=0
Nullify Upgrade Counter Incremented Date
Maintain Status=N Option 3

This is the option which is followed if the new BRAS Profile is greater than the current profile. This is the most complicated option, as there are a number of sub-options, depending firstly on whether or not the Upgrade Counter=the Upgrade Threshold, and whether or not the new BRAS Profile is greater than the Proposed Calculated BRAS Profile. For ease of reading, these are set out as two sub-options: Sub-Option 3.1 (where Upgrade Counter=Upgrade Threshold) and Sub-Option 3.2 (where Upgrade Counter<Upgrade Threshold). Within each sub-option there is an IF . . . ELSE . . . structure specifying whether the new BRAS Profile is greater than the Proposed Calculated BRAS Profile. Within Sub-Option 3.2 there are further sub-options affecting whether or not the upgrade counter is incremented, depending on whether or not the Upgrade Counter has already been incremented at least once during the current day. Thus Sub-Option 3.1

(This is followed when New BRAS Profile>Potential BRAS Profile AND Upgrade Counter=Upgrade Threshold)

---

IF New BRAS Profile <= Proposed Calculated BRAS Profile
    Set Potential BRAS Profile = New BRAS Profile
    Nullify Proposed Line Rate
    Nullify Proposed Calculated BRAS Profile
    Set Upgrade Counter = 0
    Nullify Upgrade Counter Incremented Date
    Set Status = P
ELSE IF New BRAS Profile > Proposed Calculated BRAS Profile
    Set Potential BRAS Profile = Proposed Calculated BRAS Profile
    Nullify Proposed Line Rate
    Nullify Proposed Calculated BRAS Profile
    Set Upgrade Counter = 0
    Nullify Upgrade Counter Incremented Date
    Set Status = P

Example 4

Of Case where Sub-Option 3.1 is Followed with New Profile<Proposed Profile

Event: New Line Rate=7520
New BRAS Profile=adsl6500
State: Proposed BRAS Profile=adsl7000
Potential BRAS Profile=adsl6000
Result: Set Potential BRAS Profile=adsl6500
Nullify Proposed Line Rate
Nullify Proposed BRAS Profile
Set Upgrade Counter=0
Nullify Upgrade Counter Incremented Date
Set Status=P

Example 5

Of Case where Sub-Option 3.1 is Followed with New Profile>Proposed Profile

Event: New Line Rate=7520
New BRAS Profile=adsl6500
State: Proposed BRAS Profile=adsl6000
Potential BRAS Profile=adsl5500
Result: Set Potential BRAS Profile=adsl6000
Nullify Proposed Line Rate
Nullify Proposed BRAS Profile
Set Upgrade Counter=0
Nullify Upgrade Counter Incremented Date
Set Status=P Sub-Option 3.2

(This is followed when New BRAS Profile>Potential BRAS Profile AND Upgrade Counter<Upgrade Threshold)

```
IF New BRAS Profile < Proposed BRAS Profile
    Set Proposed BRAS Profile = New BRAS Profile
    Set Proposed Line Rate = New Line Rate
    IF Upgrade Counter Incremented Date = Today
        Don't Increment Upgrade Counter
        Don't change status
    ELSE IF Upgrade Counter Incremented Date ≠ Today
        Increment Upgrade Counter
        Set Upgrade Counter Incremented Date = Today
        Don't change Status
ELSE IF New BRAS Profile => Proposed BRAS Profile
    IF Upgrade Counter Incremented Date = Today
        Don't Increment Upgrade Counter
        Don't change status
    ELSE IF Upgrade Counter Incremented Date ≠ Today
        Increment Upgrade Counter
        Set Upgrade Counter Incremented Date = Today
        Don't change Status
```

Example 6

Of Case where Sub-Option 3.2 is Followed with New Profile<Proposed Profile

Event: New Line Rate=7520
New BRAS Profile=adsl6500
State: Proposed BRAS Profile=adsl7000
Potential BRAS Profile=adsl5500
Upgrade Counter=4
Counter Incremented Date=Dec. 4, 2006
Today=13/04/2006
Upgrade Threshold=5
Status=N
Result: Maintain Potential BRAS Profile=adsl5500
Set Proposed Line Rate=7520
Set Proposed BRAS Profile=adsl6500
Increment Upgrade Counter=5
Set Upgrade Counter Incremented Date=13/04/2006
Maintain Status=N

Example 7

Of Case where Sub-Option 3.2 is Followed with New Profile=>Proposed Profile AND Counter Incremented Date=Today Event: New Line Rate=7520
New BRAS Profile=adsl6500
State: Proposed BRAS Profile=adsl6000
Potential BRAS Profile=adsl5500
Upgrade Counter=4
Counter Incremented Date=13/04/2006
Today=13/04/2006
Upgrade Threshold=5
Status=N
Result: Maintain Potential BRAS Profile=adsl5500
Maintain Proposed Line Rate=6720
Maintain Proposed BRAS Profile=adsl6000
Maintain Upgrade Counter=4
Maintain Upgrade Counter Incremented Date=13/04/2006
Maintain Status=N From the above it will be clear that the counter incremented date field is used to prevent the counter being incremented more than once per day per user. If several higher rates are logged for an end user in a single day the lowest of those rates will be kept but the counter will only ever be incremented by one for that end user. This prevents an end user from re-syncing several times during a quiet period and temporarily boosting his BRAS profile to a higher rate.

Thus it will be apparent that the above arrangement provides a method whereby an interface device (e.g. the BRAS), which interfaces between an access network (including a plurality of DSL connections between a suitable transceiver arrangement (e.g. a DSLAM) at the access network side and end user terminals on the remote side) and a high speed packet switched data network (such as a back-bone IP network) is provisioned in such a way that it is quickly re-configured to prevent excess traffic flowing through the access network destined for a DSL connection whose maximum bandwidth capacity reduce, but which is only re-configured to allow more traffic to flow through the access network towards a DSL connection whose maximum bandwidth capacity increases after certain conditions have been met. In the above described method, these conditions are that a minimum predetermined period must have elapsed without the maximum (instantaneous) bandwidth capacity dropping below a minimum increased amount, and then the interface device will only be re-configured to a state appropriate for the lowest maximum instantaneous bandwidth capacity detected during the predetermined period.

Further Enhancement

In cases where it is expected that an end user will generally be able to achieve a first bandwidth capacity over his DSL connection operating in a rate adaptive mode, but that occasionally this value may drop temporarily to a second lower capacity, the above method may be augmented by some further logic to allow the interface device (e.g. the BRAS) to be more quickly re-configured back to the stable state after a temporary drop (hereinafter referred to as a blip).

BLIP Logic

This addition to the MAX logic allows for lines which are consistently running at a higher line rate then experience a single BLIP before returning to their original higher line rate to not have to wait a number of days to increase back up to their higher BRAS profile.

For the BLIP Logic an additional set of parameters are required:
1. Consistency Counter—Count of the number of day's the End User has not seen a drop in their BRAS Profile.
2. Consistency Threshold—Threshold at which an End User is considered to be consistent and therefore a BLIP will not cause them to drop in speed for a number of days.
3. Consistency Counter Incremented Date—Date which the counter was last incremented.
4. Inconsistency Counter—Count of the number of drops in speed the End User has seen.
5. Inconsistency Threshold—Threshold at which an End User is considered to be inconsistent and therefore they will revert back to the original logic for increases in speed. In the present embodiment, this is set to 1.

On receipt of each sync/re-sync event the following logic is carried out. Reference below to original or basic Max logic or options refers to the above described, non-BLIP augmented logic or options.

Option 1

| 1. New BRAS Profile < Potential BRAS Profile (Speed Decreasing) |
| --- |
| IF Inconsistency Counter < Inconsistency Threshold<br>    Increment Inconsistency Counter<br>    IF Consistency Counter < Consistency Threshold<br>        IF Consistency Counter =>2<br>            Consistency Counter – 2<br>        Nullify Consistency Counter Incremented Date<br>    Perform original MAX Logic option 1<br>ELSE IF Inconsistency Counter => Inconsistency Threshold<br>    Set Consistency Counter = Zero<br>    Nullify Consistency Counter Incremented Date<br>    Perform original MAX Logic option 1 |

Option 2

| 2. New BRAS Profile = Potential BRAS Profile (No Speed Change) |
| --- |
| IF Consistency Counter Incremented Date = Today<br>    IF Inconsistency Counter => Inconsistency Threshold<br>        Set Consistency Counter = Zero<br>        Set Inconsistency Counter = Zero<br>        Nullify Consistency Counter Incremented Date<br>        Perform original MAX Logic option 2<br>    ELSE IF Inconsistency Counter < Inconsistency Threshold<br>        Perform original MAX Logic option 2<br>ELSE IF Consistency Counter Incremented Date <> Today<br>    IF Consistency Counter => Consistency Threshold<br>        IF Inconsistency Counter => Inconsistency Threshold<br>            Set Consistency Counter = Zero<br>            Set Inconsistency Counter = Zero<br>            Nullify Consistency Counter Incremented Date<br>            Perform original MAX Logic option 2<br>        ELSE IF Inconsistency Counter < Inconsistency Threshold<br>            Perform original MAX Logic option 2<br>            Set Consistency Counter Incremented Date = Today<br>    ELSE IF Consistency Counter < Consistency Threshold<br>        IF Inconsistency Counter => Inconsistency Threshold<br>            Set Consistency Counter = Zero<br>            Set Inconsistency Counter = Zero<br>            Nullify Consistency Counter Incremented Date<br>            Perform original MAX Logic option 2 |

-continued

| 2. New BRAS Profile = Potential BRAS Profile (No Speed Change) |
| --- |
| ELSE IF Inconsistency Counter < Inconsistency Threshold<br>    Increment Consistency Counter + 1<br>    Set Consistency Counter Incremented Date = Today<br>    Perform original MAX Logic option 2 |

Option 3

| 3. new BRAS Profile > Potential BRAS Profile (Speed Increasing) |
| --- |
| IF Consistency Counter => Consistency Threshold<br>    IF Inconsistency Counter < Inconsistency Threshold<br>        IF New BRAS Profile <= Proposed Calculated BRAS Profile<br>            Set Potential BRAS Profile to the value of the New<br>            BRAS Profile<br>            Set Proposed Line Rate = New Line Rate<br>            Nullify Proposed Line Rate<br>            Nullify Proposed BRAS Profile<br>            Set Upgrade Counter = 0<br>            Nullify Upgrade Counter Incremented Date<br>            Set Inconsistency Counter = 0<br>            Set Status to 'P' for Processed<br>        ELSE IF New BRAS Profile > Proposed Calculated BRAS<br>        Profile<br>            Set Potential BRAS Profile = Proposed BRAS Profile<br>            Nullify Proposed Line Rate<br>            Nullify Proposed BRAS Profile<br>            Set Upgrade Counter = 0<br>            Nullify Upgrade Counter Incremented Date<br>            Set Inconsistency Counter = 0<br>            Set Status to 'P' for Processed<br>    ELSE IF Inconsistency Counter => Inconsistency Threshold<br>        IF New BRAS Profile <= Proposed Calculated BRAS Profile<br>            Set Potential BRAS Profile = New BRAS Profile<br>            Nullify Proposed Line Rate<br>            Nullify Proposed BRAS Profile<br>            Set Upgrade Counter = 0<br>            Nullify Upgrade Counter Incremented Date<br>            Set Inconsistency Counter = 0<br>            Decrement Consistency Counter – 1<br>            Set Status to 'P' for Processed<br>        ELSE IF New BRAS Profile > Proposed Calculated BRAS<br>        Profile<br>            Set Potential BRAS Profile = Proposed BRAS Profile<br>            Set Upgrade Counter = 0<br>            Nullify Upgrade Counter Incremented Date<br>            Nullify Proposed Line Rate<br>            Nullify Proposed BRAS Profile<br>            Set Inconsistency Counter = 0<br>            Decrement Consistency Counter – 1<br>            Set Status to 'P' for Processed<br>ELSE IF Consistency Counter < Consistency Threshold<br>    IF Consistency Counter Incremented Date = Today<br>        Perform original MAX Logic option 3<br>        Inconsistency Counter = 0<br>    If Consistency Counter Incremented Date <> Today<br>        Increment Consistency Counter<br>        Set Consistency Counter Incremented Date = Today<br>        Perform original MAX Logic option 3<br>        Set Inconsistency Counter = 0 |

Thus, in overview, the new logic options above provide:

Option 1—If a decrease in speed occurs and it's the first (in this embodiment, since we have an inconsistency threshold of one) and the consistency counter is equal to or greater than the consistency threshold, then none of the counters are changed (except to increment the inconsistency counter). Therefore if their next speed/line rate has increased again they see an immediate increase in the BRAS Profile.

If a second decrease occurs then their consistency details are reset as they are no longer consistent and will not see an immediate increase.

Option 2—If there has been no change in speed then a check is performed using the inconsistency counter to see if this no change is after a previous decrease in speed or increase in speed.

If it's after a decrease in speed then this is treated the same as two decreases in speed and the consistency counters are reset as they are no longer consistent and will not see an immediate increase.

If it's not after a decrease in speed/line rate (i.e. it's after an increase in speed or the speed has remained constant—i.e. within the same BRAS Profile band) then this is treated as the line is consistently higher and the consistency counters are increased.

Option 3—If there has been an increase in speed then a check is performed if this is following a period where the speed has been consistent for long enough.

If it has been consistent long enough the speed is increase immediately and the inconsistent counter is nullified.

If it has not been consistent long enough the original standard increase logic is used, but the consistency counters are incremented and the inconsistency counter is reset.

The consistency counter incremented date is used to prevent the counter being incremented more than once per day per end user. This is so the consistency counter counts the number of days the end user is at the consistent rate, rather than the number of syncs received at that higher rate. As an end user could sync up 10 times in a single day at the same rate which is not the same as being synced at the same rate for 10 days.

Thus to summarise this, the arrangement operates such that the interface device (e.g. the BRAS) is re-configured to a reduced profile shortly after a decrease in line rate on one of its DSL connections is detected under all circumstances; if there is an increase in line rate detected, then the interface device will not be re-configured to a corresponding higher profile until the line rate has been detected as consistently operating at such a higher rate, and then, if there have been different higher rates detected, the interface device is reconfigured to a profile corresponding to the lowest of those different higher detected rates; however, if the increase in line rate is after a temporary drop in line rate, prior to which the line (i.e. the DSL connection) had been operating consistently at a higher rate for a predetermined period, then the interface device is quickly re-configured to a higher profile.

The invention claimed is:

1. A method of provisioning an interface device, the interface device interfacing between an access network and a back-bone network, the access network including a Digital Subscriber Line (DSL) connection to an end user terminal and a transceiver device including a DSL transceiver for modulating and demodulating signals sent to and from the end user terminal over the DSL connection, the method comprising:
providing a management device for managing the interface device, the management device communicatively coupled to the interface device;
receiving a plurality of line rate data readings at the management device from the transceiver device indicative of a current or recent line rate of the DSL connection;
calculating at the management device from the received line rate data readings a consistent rate indicative of a consistently achievable net data rate of the DSL connection based on the plurality of data readings for the DSL connection from the transceiver device; and
provisioning the interface device to restrict data flowing from the interface device to the transceiver device to a maximum data rate selected by the management device in accordance with the calculated consistent rate.

2. The method as claimed in claim 1 wherein the interface device is an Internet Protocol, IP, router device and wherein the access network provides a link layer connection between the interface device and the end user terminal, such that from an IP perspective there is one hop between the interface device and the end user terminal.

3. The method as claimed in claim 1 wherein the interface device is a Broadband Remote Access Server, BRAS, device.

4. The method as claimed in claim 1 wherein the transceiver device is a Digital Subscriber Line Access Multiplexer, DSLAM.

5. The method as claimed in claim 1 wherein the consistent rate is the lowest rate reported by the transceiver device in each week.

6. The method as claimed in claim 1 wherein the consistent rate is the lowest of the most recent line rate reading from the transceiver device and one or more rolling average line rates.

7. The method according to claim 1 wherein if a received data reading indicates that the line rate of the DSL connection has dropped to a rate corresponding to a new lower profile band for the interface device, then the interface device is reconfigured to the new lower profile within a first predetermined period and wherein if a received data reading indicates that the line rate of the DSL connection has increased to a rate corresponding to a new higher profile band for the interface device, then the interface device is re-configured to a new higher profile only after a second predetermined period, longer than said first predetermined period, and only to a new higher profile corresponding to the minimum indicated line rate of the DSL connection received during that period.

8. The method according to claim 1 wherein if a received data reading indicates that the line rate of the DSL connection has dropped to a rate corresponding to a new lower profile band for the interface device, then the interface device is reconfigured to the new lower profile within a first predetermined period and wherein if a received data reading indicates that the line rate of the DSL connection has increased to a rate corresponding to a new higher profile band for the interface device, then the interface device is re-configured to a new higher profile only after a second predetermined period, longer than said first predetermined period, and only to a new higher profile corresponding to the minimum indicated line rate of the DSL connection received during that period, except that if during a third predetermined period prior to the DSL connection rate dropping to a lower rate, it had been operating consistently at a higher line rate, then the interface device is re-configured to a higher profile within a fourth predetermined period which is shorter than said second predetermined period.

9. A computer comprising:
at least one computer processor; and
at least one computer-readable storage medium for tangibly storing thereon an executable program which upon execution by the at least one computer processor causes the computer to carry out the method of claim 1 during execution of the program.

10. A non-transitory computer-readable storage medium for tangibly storing thereon an executable computer program which upon execution by a computer processor performs the method of claim 1.

11. A management device for automatically provisioning an interface device, the interface device interfacing between an access network and a back-bone network, the access network including a Digital Subscriber Line (DSL) connection to an end user terminal and a transceiver device including a DSL transceiver for modulating and demodulating signals sent to and from the end user terminal over the DSL connection, the management device comprising:

a receiver for receiving data readings from the transceiver device indicative of the current or recent line rate of the DSL connection;

a processor for calculating at the management device from the received data readings a consistent rate indicative of a consistently achievable net data rate of the DSL connection based on a plurality of data readings for the DSL connection from the transceiver device; and a transmitter, communicatively coupling the management device to the interface device, for transmitting provisioning messages to the interface device to provision the interface device to restrict data flowing from the interface device to the DSL connection to a maximum data rate selected by the management device in accordance with the calculated consistent rate.

12. The management device according to claim 11 wherein the consistent rate is the lowest rate reported by the transceiver device in each week.

13. The management device according to claim 11 wherein the consistent rate is the lowest of the most recent line rate reading from the transceiver device and one or more rolling average line rates.

14. The management device according to claim 11 wherein if a received data reading indicates that the line rate of the DSL connection has dropped to a rate corresponding to a new lower profile band for the interface device, then the interface device is reconfigured to the new lower profile within a first predetermined period and wherein if a received data reading indicates that the line rate of the DSL connection has increased to a rate corresponding to a new higher profile band for the interface device, then the interface device is re-configured to a new higher profile only after a second predetermined period, longer than said first predetermined period, and only to a new higher profile corresponding to the minimum indicated line rate of the DSL connection received during that period.

15. The management device according to claim 11 wherein if a received data reading indicates that the line rate of the DSL connection has dropped to a rate corresponding to a new lower profile band for the interface device, then the interface device is reconfigured to the new lower profile within a first predetermined period and wherein if a received data reading indicates that the line rate of the DSL connection has increased to a rate corresponding to a new higher profile band for the interface device, then the interface device is re-configured to a new higher profile only after a second predetermined period, longer than said first predetermined period, and only to a new higher profile corresponding to the minimum indicated line rate of the DSL connection received during that period, except that if during a third predetermined period prior to the DSL connection rate dropping to a lower rate, it had been operating consistently at a higher line rate, then the interface device is re-configured to a higher profile within a fourth predetermined period which is shorter than said second predetermined period.

16. A method of provisioning an interface device, the interface device interfacing between an access network and a back-bone network, the access network including a transceiver device for establishing a Digital Subscriber Line (DSL) connection to an end user terminal, the method comprising:

providing a management device communicatively coupled to both the interface device and the transceiver device;

receiving a plurality of line rate data readings at the management device from the transceiver device indicative of a current or recent line rate of the DSL connection, the line rate data readings being indicative of a maximum amount of end user data that can be transmitted;

calculating at the management device a consistent user data rate indicative of a consistently achievable line rate of the DSL connection based on the plurality of line rate data readings for the DSL connection received from the transceiver device; and provisioning the interface device to restrict data flowing from the interface device to the DSL connection to a maximum rate selected by the management device in accordance with the calculated consistent user data rate.

17. The method as claimed in claim 16 wherein the interface device is a Broadband Remote Access Server (BRAS) device.

18. The method as claimed in claim 16 wherein the transceiver device is a Digital Subscriber Line Access Multiplexer (DSLAM).

19. The method as claimed in claim 16 wherein the consistent rate is the lowest of the most recent line rate reading from the transceiver device and one or more rolling average line rates.

20. The method according to claim 16 wherein if a received data reading indicates that the line rate of the DSL connection has dropped to a rate corresponding to a new lower profile band for the interface device, then the interface device is reconfigured to the new lower profile within a first predetermined period and wherein if a received data reading indicates that the line rate of the DSL connection has increased to a rate corresponding to a new higher profile band for the interface device, then the interface device is re-configured to a new higher profile only after a second predetermined period, longer than said first predetermined period, and only to a new higher profile corresponding to the minimum indicated line rate of the DSL connection received during that period.

* * * * *